C. M. BACKMAN.
VEHICLE WHEEL.
APPLICATION FILED AUG. 22, 1910.

980,474.

Patented Jan. 3, 1911.

2 SHEETS—SHEET 1.

Witnesses:
Clarence J. Williams
Andrew Smith

Inventor,
Charles M. Backman.
by Semer G. Wells
Attorney.

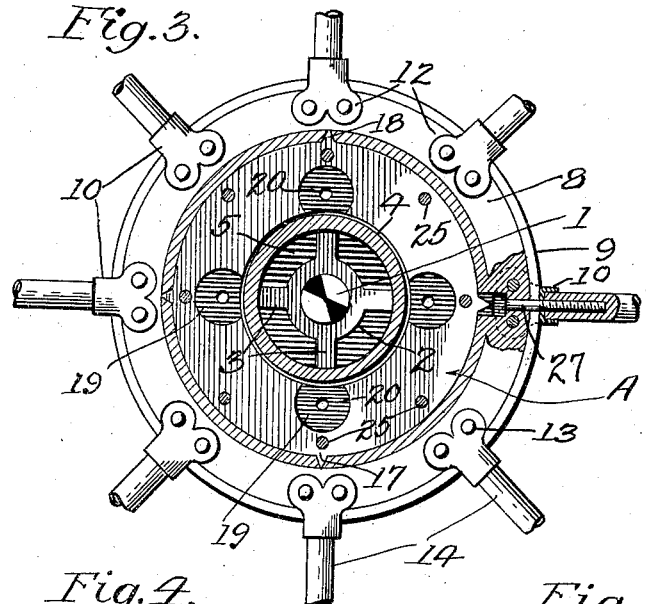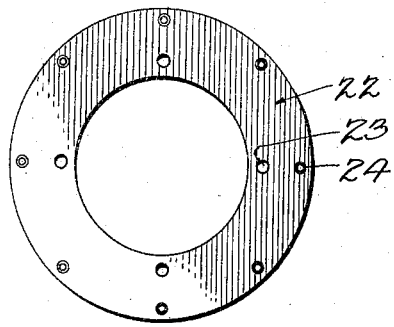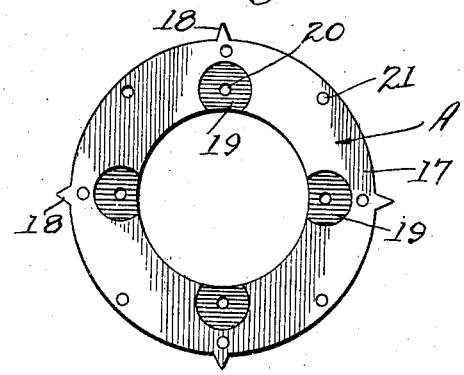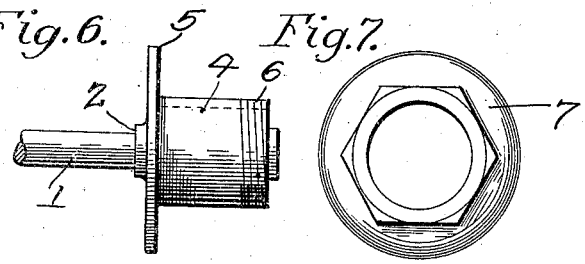

UNITED STATES PATENT OFFICE.

CHARLES M. BACKMAN, OF LOS ANGELES COUNTY, CALIFORNIA.

VEHICLE-WHEEL.

980,474.  Specification of Letters Patent.  Patented Jan. 3, 1911.

Application filed August 22, 1910. Serial No. 578,413.

*To all whom it may concern:*

Be it known that I, CHARLES M. BACKMAN, a citizen of the United States, residing in Los Angeles county, California, have invented a new and useful Vehicle-Wheel, of which the following is a specification.

My object is to improve the details of a roller bearing wagon axle; and my invention consists of the novel features herein shown, described and claimed.

Figure 1:
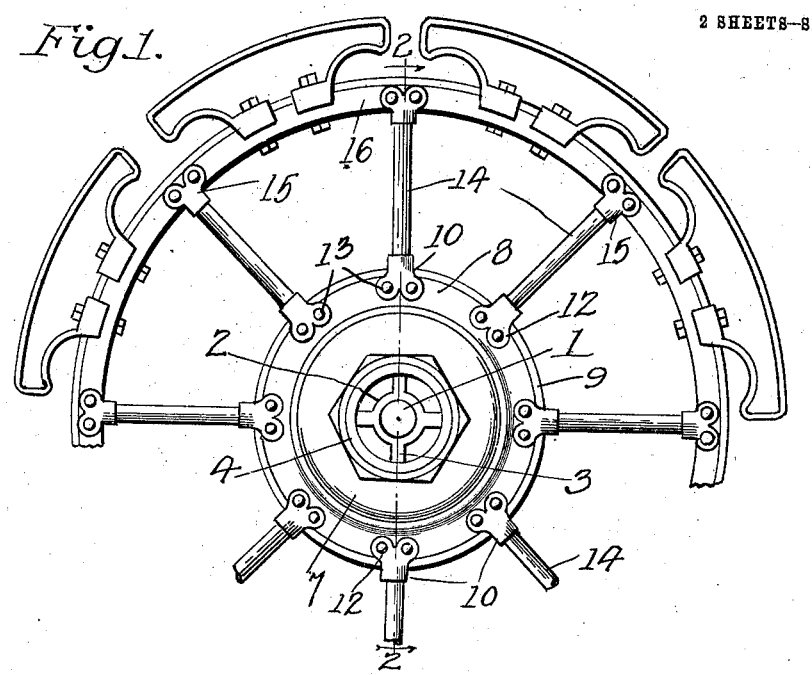
Figure 2:
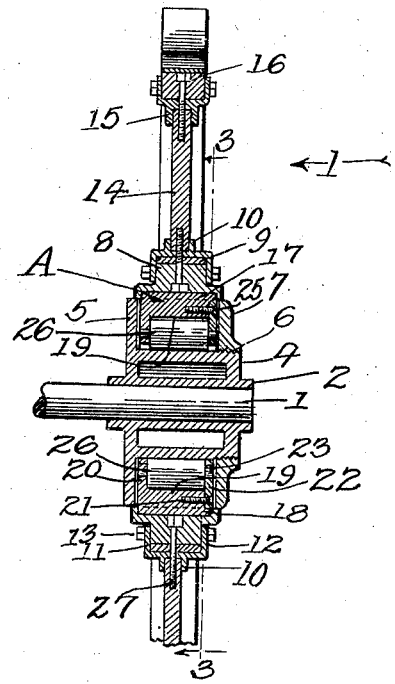

In the drawings: Figure 1 is a fragmental elevation of a vehicle wheel embodying the principles of my invention, as seen from the outside and as indicated by the arrow 1 in Fig. 2. Fig. 2 is a sectional detail longitudinally of the axle and taken on the line 2—2 of Fig. 1. Fig. 3 is an enlarged sectional detail on a plane parallel with Fig. 1 and taken on the line 3—3 of Fig. 2. Fig. 4 is a view in elevation of one of the housing plates carrying the bearings for the rollers. Fig. 5 is a view in elevation of the other housing plate carrying bearings for the rollers, the plate shown in Figs. 4 and 5 when put together serving as a housing for the rollers. Fig. 6 is a view in elevation of one of the axles. Fig. 7 is a view in elevation of the nut fitting upon the axle shown in Fig. 6.

Referring to the drawings in detail the axle tree 1 is fixed rigidly in inner shell 2. Spokes or webs 3 extend radially from shell 2 and the bearing shell 4 is formed upon the outer ends of spokes 3. The flange 5 extends from the inner end of outer shell 4 and screw threads 6 are formed upon the outer end of the outer shell 4. The inner shell 2, the web 3, the outer shell 4, and the flange 5 are or may be cast integral, and the periphery of the outer shell 4 is turned and finished concentric to the axle tree 1, and nut 7 fits upon the screw thread 6.

In Fig. 1 I have shown a wagon wheel having my spring rim as shown, described and claimed in my application for spring wheel, filed July 13, 1910, #571,693, and I do not wish to claim the spring wheel feature in this application.

In constructing the hub for my present invention the wooden ring 8 is provided with an external band 9 and the inner spoke sockets 10 are provided with ears 11 and 12 to fit against the sides of band 9 and the wood rim 8, and the bolts 13 pass through the ears 11 and 12 and through the wood rim 8 to hold the spoke sockets 10 in place.

The spokes 14 extend from the inner spoke sockets 10 to outer spoke sockets 15, said outer spoke sockets being secured to the outer wooden rim 16.

The roller housing A comprises the annular housing plate 17 fitting tightly in the wooden rim 8, and having teeth 18 extending into the wood to prevent rotation of the wood relative to the housing plate; there being roller chambers 19 bored from one end face of the plate 17, nearly through the plate and leaving bearings 20 to receive the pintles of the bearing rollers; there being screw threaded holes 21 bored from the same face as the bearing chambers; and the second housing plate 22 fitting against the end face of the housing plate 17 and closing the ends of the roller chambers 19; there being bearings 23 in alinement with the bearings 20 to receive the opposite pintles of the rollers; and there being openings 24 and screws 25 inserted through the openings 24 and screws seated in the openings 21 to hold the second housing plate rigidly in place. The bearing rollers 26 are placed in the roller chambers 19 with their pintles in the openings 20 and 23, said bearing rollers engaging the periphery of the outer axle shell 4.

I desire to call especial attention to the fact that I have enlarged the diameter of the axle bearing and correspondingly enlarged all of the working parts, and that there is a circulation of air between the inner shell 2 and the outer shell 4 to keep the axle from heating.

Bolts 27 are inserted from the interior of the wood rim 8 outwardly through the wood rim and screw seated in the inner ends of the spokes 14; the heads of the bolts being recessed into the inner face of the wood rim.

The flange 5 and the nut 7 are larger in diameter than the housing plate 17 so as to form close joints with the wood rim 8, thereby excluding dirt from the bearings.

I claim:

1. In a vehicle wheel, a wooden rim, an iron band around the wooden rim, spoke sockets against the outer face of the iron band, ears extending inwardly from the spoke sockets on each side of the iron band and the wooden rim and secured in place, spokes in the spoke sockets, bolts inserted from the interior of the wooden rim through the wooden rim and iron band and screw seated in the ends of the spokes, a roller housing fixed in the wooden rim, rollers in the roller housing, axle spokes extending outwardly from axle, a shell upon the spokes and fitting against the rollers, a flange extending outwardly from the inner end of the shell past the roller housing to the wooden rim, and a nut screw seated upon the outer end of the shell and extending outwardly past the roller housing to the wooden rim.

2. In a vehicle wheel, an axle, spokes extending outwardly from the axle, a shell upon the spokes concentric to the axle, a flange extending outwardly from the inner end of the shell, a nut adapted to be screw seated upon the outer end of the shell, a roller housing, rollers in the roller housing and fitting around the shell, and a wooden rim around the roller housing, said flange and said nut extending outwardly past the roller housing to the wooden rim.

CHARLES M. BACKMAN.

Witnesses:
ANDREW K. MARTELL,
HANNA MENDENHALL.